July 28, 1925.
J. P. FERRITER ET AL
1,547,866
TELEGRAPH RELAY
Filed Aug. 29, 1923
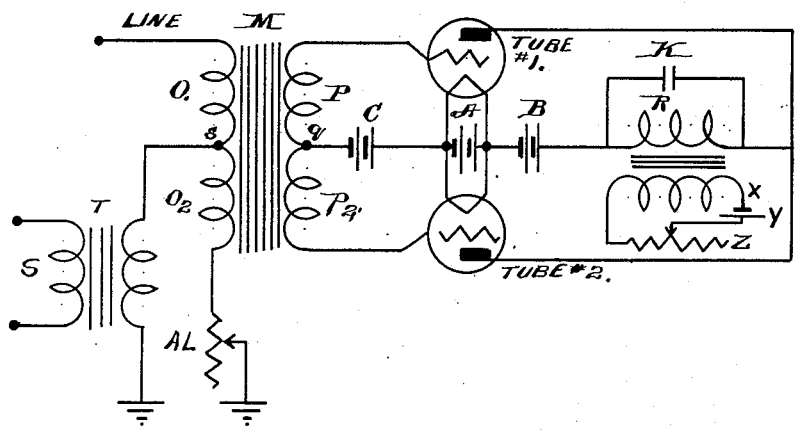
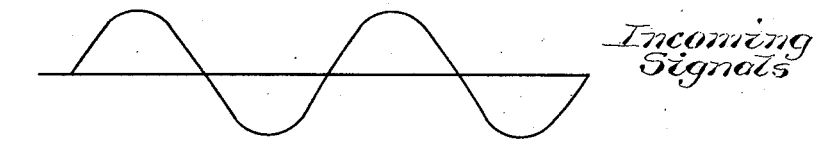
Incoming Signals
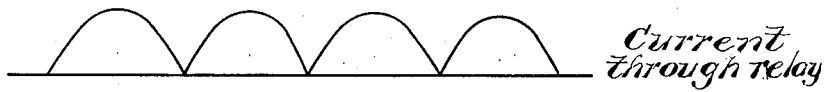
Current through Relay
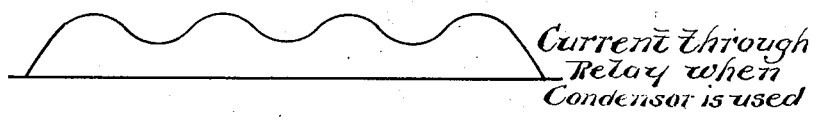
Current through Relay when Condensor is used
John P. Ferriter
Wright H. Johnson
Inventors
By Robert A. Young
Attorney Patented July 28, 1925.

1,547,866

UNITED STATES PATENT OFFICE.

JOHN P. FERRITER, OF OCEANPORT, AND WRIGHT H. JOHNSON, OF RED BANK, NEW JERSEY.

TELEGRAPH RELAY.

Application filed August 29, 1923. Serial No. 660,024.

*To all whom it may concern:*

Be it known that we, JOHN P. FERRITER and WRIGHT H. JOHNSON, citizens of the United States, residing, respectively, at Oceanport and Red Bank, in the county of Monmouth and State of New Jersey, have invented certain new and useful Improvements in Telegraph Relays, of which the following is a specification.

The invention relates to alternating current telegraphic devices employing vacuum tubes or the like and has for one of its principal objects to provide an amplifying method of reception that so coordinates the opposite alternating current impulses as to cooperate in working a receiver or relay.

A further object is the application of such invention to a duplex system although it may be employed quite generally. In general it should be understood that where alternating currents of low frequency are employed, the system disclosed hereinafter is especially adaptable for the selective reception of several frequencies over one and the same filtered line.

Further features of the invention are hereinafter described in detail and illustrated in the accompanying drawings in which:

Figure 1 is a circuit diagram of the arrangement of working duplex reception.

Figure 2 is a diagrammatic illustration of the rectification currents upon the relay.

Figure 3 is a diagrammatic illustration of the effects of the relay condenser.

Referring more particularly to the drawings, M is an iron core transformer having the primary windings $O_1$ and $O_2$, and secondary windings $P_1$ and $P_2$. Outgoing line current is introduced into the middle point of the primary windings $s$ by means of the transformer T. The coils $O_1$ and $O_2$ are connected respectively to the line and the artificial line and replace the line and the artificial line coils of the ordinary type of relay. A balance is established by varying the artificial line resistance just as in the case of the ordinary direct current duplex. Since the system is balanced to outgoing signals, there will be no potential induced in the coils $P_1$ and $P_2$.

In the case of incoming signals there is an unbalance due to the fact that the windings $O_2$ and the secondary of the transformer T form parallel paths to the ground. A voltage will therefore be induced in the windings $P_1$ and $P_2$. Tubes 1 and 2 are three-electrode vacuum tubes lighted by the filament battery A. The plate potential is furnished by the battery B through the windings of the relay R. The grids are kept strongly negative by means of the battery C. The grids of the tubes are connected to the terminals of coils $P_1$ and $P_2$ respectively.

Suppose that a given half cycle induces a positive potential on the grid of tube 1. An increase in current in the plate circuit of tube 1 through the windings of the relay R results and the relay is actuated. At the same instant a negative potential is applied to the grid of tube 2. This grid is already negative due to battery C and on account of the curvature of the characteristic of the tube, there is no decrease in plate current of tube 2 due to its grid potential becoming more negative. At the next half cycle the grid of tube 2 becomes positive and the grid of tube 1 becomes negative so that an increase in current in the plate circuit of tube 2 through the windings of the relay R results so that the relay remains closed.

The result is that an alternating current impressed on the grids of the tubes 1 and 2 produces a pulsating direct current through the windings of the relay R. (Figure 2.) The action of the condenser K is to smooth out the pulsating current and keep the relay from chattering. Figure 3 shows the relay current when the condenser K is used.

An opposing coil X in the relay is used in connection with the battery Y and the variable resistance Z to give proper bias to the relay and to counteract the effect of the steady direct current component of the plate current on the relay.

The system above described will operate on any alternating current of any frequency. It can be applied to one way, duplex and quadruple telegraphy. The advantages to be gained by the use of this device are that low frequency alternating current may be used on telegraphic lines and that vacuum tube repeaters may be used in the case of land lines and terminal amplifiers may be used in the case of submarine cables.

Having thus described our invention, we claim:

1. In combination with a line source of alternating current, a plurality of rectifying amplifier vacuum tubes excited by said line source, at least one of said plurality of tubes in each leg of said exciting source and a relay operated by the unidirectional currents induced by both halves of said alternating current source, and an exciting direct current coil means to give to said relay a proper bias during operation.

2. In combination with a line source of alternating current, a plurality of rectifying amplifier vacuum tubes excited by said line source, at least one of said plurality of tubes in each leg of said exciting source, a direct current amplifying source for said amplifier vacuum tubes, and a relay operated by the unidirectional currents induced by both halves of said alternating current source, and drawing its power from said direct current source, and an exciting direct current coil means to give to said relay a proper bias against the steady effect of said direct current amplifying source.

In testimony whereof we affix our signatures.

JOHN P. FERRITER.
WRIGHT H. JOHNSON.